R. S. T. RUSSELL.
Flour-Bolt Feeders, &c.

No. 204,454.   Patented June 4. 1878.

Attest:
Chas. M. Higgins
E. H. Wales.

Inventor:
R S T Russell
by his Attorneys
J. H. Wales & Son

UNITED STATES PATENT OFFICE.

ROMULUS S. T. RUSSELL, OF STANTON, DELAWARE.

IMPROVEMENT IN FLOUR-BOLT FEEDERS, &c.

Specification forming part of Letters Patent No. 204,454, dated June 4, 1878; application filed December 15, 1877.

*To all whom it may concern:*

Be it known that I, ROMULUS S. T. RUSSELL, of Stanton, New Castle county, Delaware, have invented an Improved Flour-Bolt Feeder and Flour-Distributer, of which the following is a specification:

The object of my invention is to provide an improved machine which shall effectively divide a large stream of flour into several subdivisions, and distribute and feed the same uniformly to a number of separate purifiers, bolting-reels, or other machines or destinations.

My invention consists of a number of novel features, which will be first fully described, and then specifically indicated in the concluding clauses.

Figure 1:
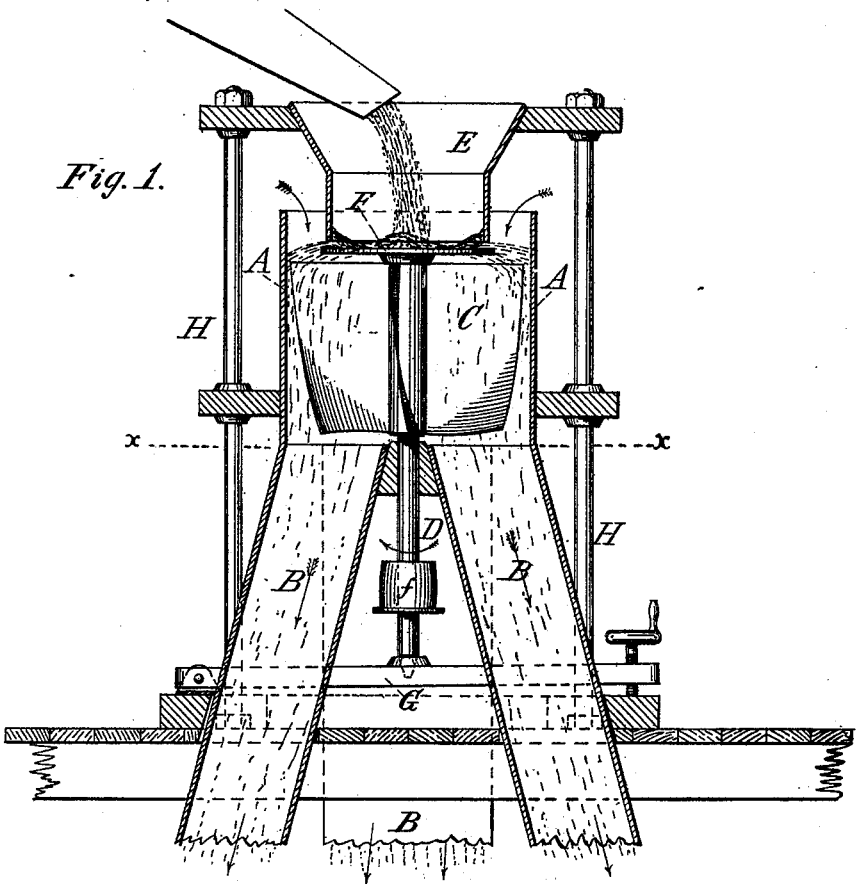
Figure 2:
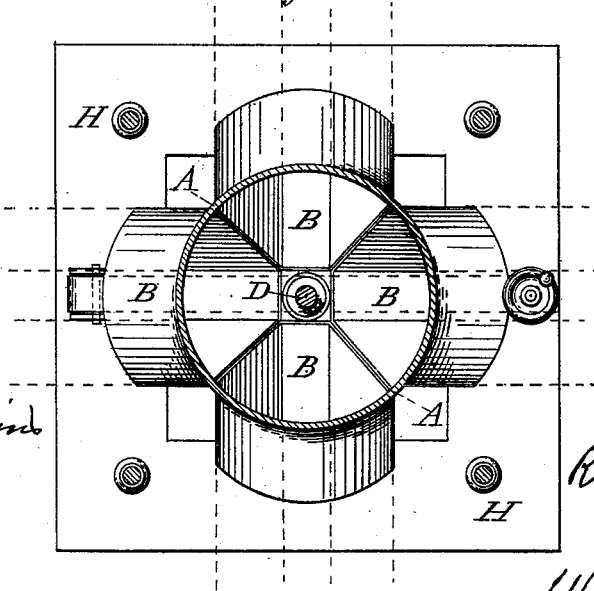

In the drawings, Figure 1 presents a vertical central section of my improved machine, and Fig. 2 represents a sectional plan on line $x\ x$ of Fig. 1.

The frame of the machine is indicated by H H, in which is mounted an upright cylinder, A, forming the receptacle of the machine, and into which the unbolted or other flour is discharged, and from which it is distributed and fed to its various destinations. From the bottom of the receptacle A a series of tubes, chutes, or subdivisions, B B, extend. These divisions, as shown, are arranged axially to the receiving-chamber A, and are so disposed radially, as shown in Fig. 2, as to uniformly divide the whole diametrical area of the receptacle, the divisions having their sides made of such shape as to admit of their being set in a circle beneath the receptacle, and meeting at their juncture in a narrow edge, so as to offer no resistance to the passage of the flour, and to sharply and uniformly divide the same. The divisions B B diverge, as shown, at a slight inclination from their junction with the receiving-chamber A, and extend in various directions, passing, as represented, through the top of the bolting-chests or the floor of the mill, and thence continued in the desired directions by the attachment of spouts or chutes, to deliver the divided flour to a number of bolting-reels or other machines or places in any part of the mill. An upright rotary shaft, D, extends centrally through the machine, being provided with a pulley, $f$, by which a rapid rotary motion is imparted thereto. The shaft is also provided at the upper end with a fan, C, which occupies the receiving-chamber A, and it is finally surmounted by a circular disk, F, which revolves close to the open bottom of the receiving-hopper E, into which the stream of unbolted flour first enters. The lower end of the shaft is supported on an adjustable bridge-tree, G, which may be raised or lowered to adjust the opening between the hopper and the disk, in order to regulate the feed of the flour, as desired. The fan rotates in a direction to cause an inward and downward air-current through the receiving-chamber A and distributing-chutes B B, and it occupies nearly the whole chamber A, revolving closely to the sides thereof and over the mouths of the divisions B B.

The main objects of the fan and disk are as follows: first, to evenly scatter the descending stream of meal over the divisions B B; second, to drive a blast of air down the divisions with the meal; third, to drive the meal off to the circumference of the receptacle with the disk, so that the fan will act almost entirely on the air, thereby producing a more powerful blast; and, fourth, to crush any clots or lumps by the combination of centrifugal force and friction against the sides of the receptacle A, which will separate and destroy the cohesion of any lumps that may be formed in a much more thorough manner than when such or similar revolving devices are used in connection with receptacles turning with them, as there is no friction when the two revolve together.

The stream of unbolted flour is delivered into the hopper E, as represented in Fig. 1, where it falls on the rapidly-revolving disk F, which throws it by centrifugal action forcibly and in a fine sheet through the opening between disk and hopper into the receptacle A, where it descends both by the action of gravity and the downward air-current caused by the fan, being agitated and revolved by the fan, and distributed evenly thereby over the whole area of the receptacle, thus being forced to descend in equal and uniform currents through the chutes B B, and passing on through the continuations thereof, in streams of equal and steady flow, to the bolting-reels, purifiers, or other machines or places to which it is to be fed or delivered.

This distribution of a large stream of flour has heretofore been quite desirable in flouring-mills, and by means of my improved machine it is perfectly accomplished.

The current produced by the fan, while serving to effectively feed the flour, also assists the action of the bolting or other machines, as it serves to drive the light, "fluffy" stuff to the back of the reel, and to keep it out of the flour.

The fan, instead of being composed of the vanes shown, may be made up of a series of large tubes, fixed to the shaft and inclined slightly to the axis of the same; but the form shown is preferred.

I aware that it is not new to use revolving receptacles in combination with chutes; but such devices as hitherto used do not show my peculiar construction; and I am also aware that both revolving and fixed beaters have been used in millstone-feeders in combination with revolving receptacles; but these devices operate differently from mine.

What I claim as my invention is—

1. The combination, with a receptacle, A, of a series of distributing-chutes, B B, having their sides so formed as to admit of their being arranged in a circle at the bottom of the chamber, so as to radiate therefrom and to meet on a sharp edge at their junction therewith, substantially in the manner described and set forth.

2. The combination of the receptacle A and distributing-chutes B B with a positively-driven draft-fan, C, revolving independently within the receptacle A and over the mouths of the chutes B B, substantially as described.

3. The combination of a fixed receptacle, A, and chutes B B with a rotary disk, F, arranged and operating substantially as described.

4. The combination of a receptacle, A, chutes B B, draft-fan C, and rotary disk D, operating in the manner and for the purpose specified.

5. The combination of the receptacle A, distributing-chutes B B, draft-fan C, shaft D, disk F, and hopper E, the whole arranged and operating in the manner set forth and described.

ROMULUS S. T. RUSSELL.

Witnesses:
HARRY A. MARSHALL,
WM. A. CORKRELL.